Dec. 27, 1949       M. BONNET       2,492,836
APPARATUS FOR INSTANTANEOUS PHOTOGRAPHY
IN RELIEF AT VARIABLE DISTANCES
Filed July 3, 1946       5 Sheets-Sheet 1

Inventor
MAURICE BONNET
By Haseltine, Lake & Co.
Attorneys

Patented Dec. 27, 1949

2,492,836

UNITED STATES PATENT OFFICE 2,492,836

APPARATUS FOR INSTANTANEOUS PHOTOGRAPHY IN RELIEF AT VARIABLE DISTANCES

Maurice Bonnet, Paris, France, assignor to La Reliephographie, Societe pour l'Exploitation des Procedes de Photographie en Relief Maurice Bonnet, Paris, France, a French corporation Application July 3, 1946, Serial No. 681,168
In France June 14, 1945

Section 1, Public Law 690, August 8, 1946
Patent expires June 14, 1965

7 Claims. (Cl. 95—18)

In my French Patent No. 833,891, of August 1, 1938, I have described and illustrated apparatus for relief photography, wherein a plurality of negative images of the subject photographed are taken simultaneously, each of these images corresponding to a different view point. This apparatus comprises three horizontal rows of objective lenses, the optical axes of which intersect one another in a line, in which prisms are placed. These prisms distribute cylindrically amongst the objective lenses of the three rows the rays of light coming from the subject. One photographic plate corresponds to each row of lenses. There are therefore three plates to be exposed for each photograph taken.

The apparatus in question is designed for taking photographs always at the same distance. The partitions separating the camera chambers corresponding to the individual lenses are consequently so inclined as to converge towards the point that is being photographed.

The present invention relates to apparatus for relief photography of the kind set forth, but having the important advantage of being capable of operating at any desired distance from the subject, ranging for example from 150 centimetres to infinity.

As compared with the apparatus described in the above-mentioned patent, the present invention also exhibits the following important improvements:

(1) The present invention comprises only two rows of objective lenses instead of three. In addition to the advantages of simplification, saving in weight, and reduction of cost thus attained, this improvement renders it possible to make the paths of all the rays of light inside the apparatus symmetrical in relation to the axis of the apparatus, and consequently to obtain two rows of negative images exhibiting exactly the same photographic characteristics.

(2) The two sets of negative images are superposed upon a single negative plate, which is perpendicular to the sighting axis of the camera. This obviates the disadvantage of the manipulation and delicate adjustment of the three separate plates obtained with the apparatus described in the above-mentioned specification. No displacement is to be feared in the development of the various negative images corresponding to the same exposure.

(3) The arrangement of the new apparatus is such that the same plate can be used for taking two successive photographs, by simply inverting the plate-holder that carries the plate.

(4) This latter advantage is further enhanced by the fact that the plate-holder slide is made double, with two plates back to back. Under these conditions two more photographs can be taken after turning the plate-holder to back.

The operations of loading and unloading the camera are therefore greatly simplified.

(5) Finally the prisms used in the earlier camera are replaced by mirrors, thus enabling the weight of the apparatus as a whole to be considerably reduced, and facilitating mounting and adjustment.

Other features of the invention will appear from the following detailed description of a practical form of construction illustrated in the accompanying drawings, in which.

Figure 1:
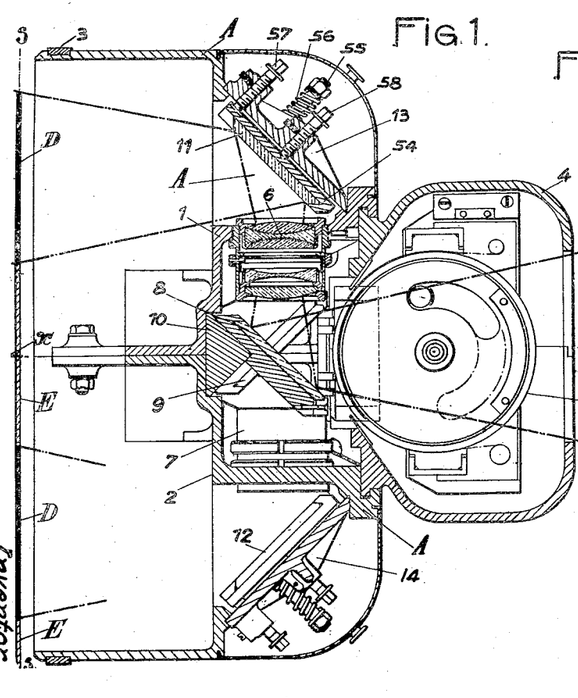
Figure 1 shows part of the apparatus in cross section.

As shown in Figure 1, the apparatus consists essentially of a main body A, formed of two halves 1 and 2, assembled along the horizontal plane of symmetry X—Y of the apparatus, this plane coinciding with the sighting plane. It also comprises (see Figure 10) a rear part B forming a plate-holder, which is movable relatively to the body A in the front and rear direction of the apparatus. Packings 3 ensure a light-tight joint between the two parts A and B, which slide relatively to one another. At the front of the apparatus is mounted, in a readily detachable manner, the casing 4 of a shutter 5 of the cylinder type, which is common to all the objective lenses. This shutter is of the kind described in my French patent application of February 26, 1943, entitled: "Slit shutter for photographic cameras."

According to the invention, the apparatus comprises two horizontal rows of objective lenses 6, 7, situated in the same vertical plane, with their optical axes perpendicular to the axis X—Y. The lenses in one row are in staggered relationship to those in the other row, as clearly shown in Figure 2, to an extent equal to half the distance between the axes of the said lenses.

Each lens is placed between two mirrors inclined at 45 degrees, one above and the other below, so that the direction of the rays of light impinging upon the plate is substantially parallel to their direction on entering the apparatus. These mirrors are arranged in three horizontal rows, namely a central double row and two outer rows. These three rows of mirrors are in the same vertical plane as the lenses.

The mirrors 8 and 9 of the central row, corresponding to the lenses 6 and 7 respectively are carried by a straight guide bar or rule 10, fixed to the two halves 1 and 2 of the body A, which are rigidly secured together.

The mirrors 11 and 12 of the two outer rows are resiliently mounted upon two plates or frames 13 and 14 respectively, each of which is releasably fixed to one of the two halves 1 and 2 of the body of the apparatus. The mirrors 11 and 12 are adjustable individually, by means of a device which will be hereinafter described.

Figure 2:
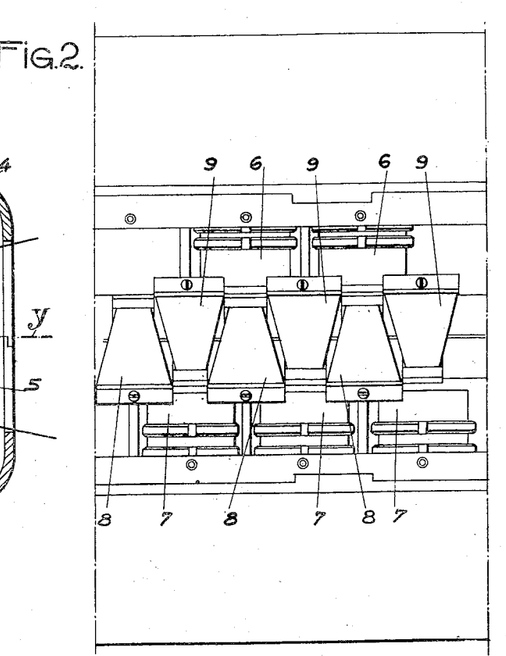
Figure 2 is a front view of part of the apparatus, the shutter being removed.

The mirrors 8 and 9 are preferably trapezoidal, as in the example illustrated in Figure 2, so as to enable the field of view of the lenses to be fully utilized.

The path of the rays in each of the two halves of the apparatus is indicated in dot-and-dash lines in the upper part of Figure 1. It will be seen that the beams of light affect only the two regions D, D in the vertical plane S—S, which represents the plane of the sensitized surface.

Figure 3:
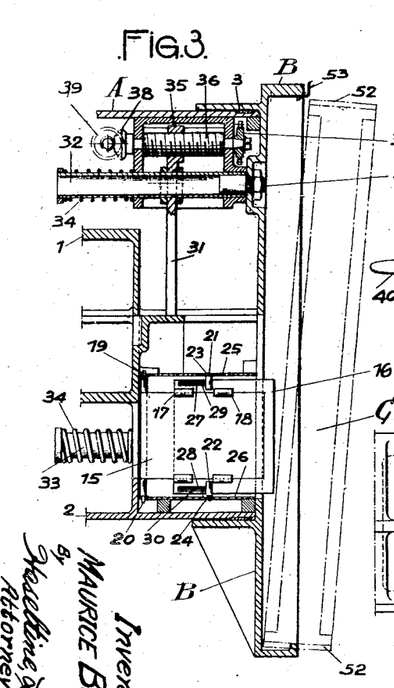
Figure 3 represents two partial cross sections passing through two different vertical planes, the lower half of the figure showing the adjustable partitions that separate the various photographic chambers that the apparatus comprises, and the upper half showing the mechanism that controls them, which is situated at the two ends.
Figures 4, 5, 6:
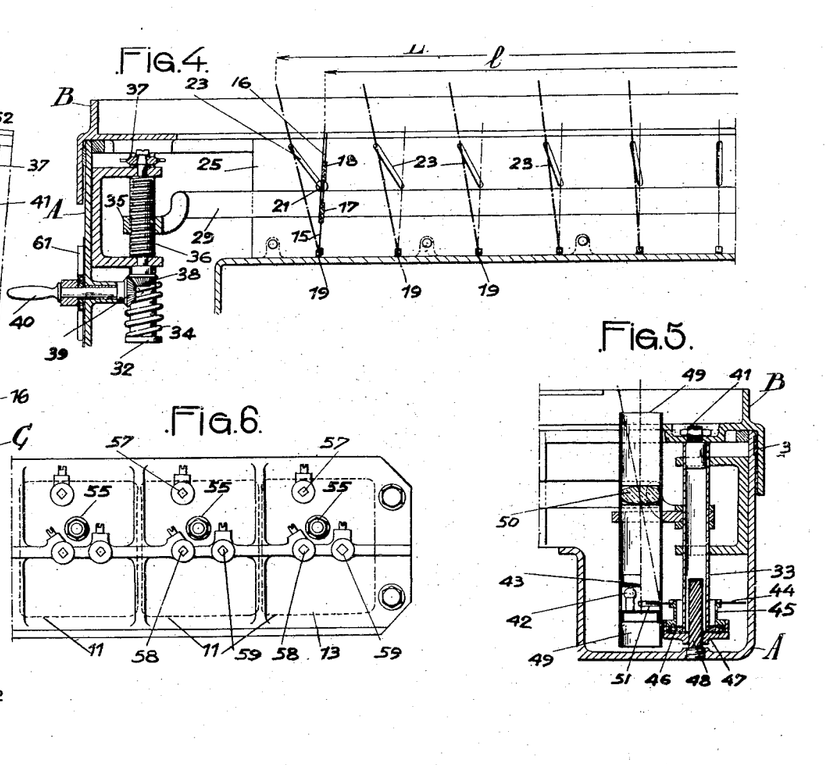
Figure 4 is a partial view, partly in horizontal section and partly in plan, of the mechanism controlling the partitions.
Figure 5, which corresponds to Figure 4, shows the other end of the apparatus, in which the mechanism for adjusting the photographing distance is accommodated.
Figure 6 is a detail view, in plan, of a mirror-carrying plate.

According to the invention the partitions marked 15, 16 in Figures 3 and 4 form the boundaries of two horizontal series of camera chambers, each corresponding to one of the lenses.

The two panels 15 and 16 constituting each of these partitions are capable of sliding relatively to one another, by means of guides 17, 18, carried by the panel 16 in the example illustrated. The panel 15 of each partition is hinged to the body A of the apparatus by means of two vertical trunnions 19 and 20. Each panel 16 carries moreover two vertical tenons 21, 22, engaging in guiding slots 23, 24 in two horizontal plates or frames 25, 26, suitably secured in the body A. In each panel 16 are provided two rectangular apertures 27 and 28, through which pass two horizontal cross bars 29 and 30. At each of their ends the cross bars 29 and 30 are connected to a vertical bar 31, to which are rigidly attached two guide tubes 32 and 33. Antagonistic springs 34 push back the tubes 32 and 33 towards the left, in Figure 3, thus carrying with them in the same direction the bars 31 and the panels 16.

At both ends of the bars 31 are moreover formed nuts 35, in each of which engages a screw 36, and to the end of each screw is fixed a pinion 37. A chain, not shown, engages with the four pinions 37, extending round the apparatus, and causes them to rotate together. One of the four screws 36 is also equipped with a bevel pinion 38, which meshes with another bevel pinion 39, which in its turn is driven from the outside by means of a crank 40, shown in Figure 4.

The rear part B of the apparatus, forming the plate-holder is rigidly fixed to the extremities of the tubes 32 and 33 by bolts 41, and is consequently solid with these tubes in their longitudinal sliding motion.

In one of the corners of the apparatus is provided a device for recording the distance at which the view has been taken. This device, illustrated in Figure 5, is in part lodged in one of the tubes 33. It consists essentially of a lamp 42, partially masked by a screen 43, and capable of being lighted automatically at the instant when the camera shutter is actuated, by means of an electric contact, not shown. This lamp illuminates a disc 44, which bears, on its periphery, numerals corresponding to the various distances at which photographs may be taken. This disc is carried by a sleeve 45, comprising a ball-bearing abutment 46, forming a nut 47. In this nut screws a threaded rod 48, which is rigid with the body A of the apparatus. The lamp 42 is lodged, together with the screen 43, in a tube 49, which also contains an objective lens 50. The tube 49 is extended rearwards into the immediate neighbourhood of the sensitized surface. The disc 44 penetrates into a slot 51 in the tube 49, by the part thereof that bears the graduations. The method of operation of this device will be hereinafter explained.

The plate-holder C, represented in dot-and-dash lines in Figure 3, is of the twin type, that is to say, it consists in a known manner of two plate-holders coupled back to back. It can therefore accommodate two plates.

As Figure 3 shows, the devices 52 for locking the plate-holder C in the part B, which cooperate with the flat bolt 53, and which may be of any convenient construction, are provided both at the top and at the bottom of the plate-holder. The latter can therefore be turned upside down, after the first photograph has been taken, and locked afresh in the part B, for the taking of the next view, the parts of the sensitized surface that have remained unaffected at the first exposure, which are denoted by E in Figure 1, being utilized for this second photograph. Under these conditions the two rows of negative images corresponding to the second exposure will be arranged top to bottom in relation to those of the first exposure.

After the second exposure the plate-holder C can be turned front to back, to enable the two following views to be taken upon a second plate contained in the holder.

It is recognised that the camera described should be utilised for projecting the multiple negative images taken therewith, for the purpose of obtaining positives therefrom. Now the double plate-holder in question obviously does not admit of being employed for projecting the plates, since its closure slides always mask one of its faces, and it includes a solid partition between the two plates that it contains.

The apparatus is of course also provided with an unmasked printing plate-holder, capable of being substituted for the double plate-holder C in the part B. This printing plate-holder, which is not shown, consists in fact of a simple frame. It comprises the same locking means 52 as the plate-holder C, and any convenient devices for fixing and adjusting the negative plate, which should of course occupy exactly the same position in the apparatus for projection as it did for taking the photograph.

With a view to the projecting of the negatives it is also necessary to dismount the cylindrical shutter 5. For this reason it is so constructed as to be readily removable as a whole, by means for example of a known bayonet-joint device.

It has already been mentioned that the mirrors 11 and 12 of the two outer rows are mounted individually and resiliently upon their frame plates, 13 and 14 respectively. Figures 1 and 6 illustrate in fuller detail how this mounting is effected. Each mirror is secured in a mount 54, to the back of which is fixed a screw-threaded rod 55, which passes through the frame plate. A helical spring, the tension of which is adjustable, presses the mount against the internal surface of this plate. Facing each mirror the frame plate carries three thrust screws 57, 58 and 59, arranged at three points corresponding to the angles of a right-angled triangle, the rod 55 itself being situated at the point of intersection of the three medians of this triangle. The screws 57, 58 and 59 act upon the mount 54, against the action of the spring 56, according to the point-line-plane principle, which is well known in optics. For this purpose the point of one of the three screws, 58 for example, bears in a circular cup in the mount 54. The point of the screw 57 is itself engaged in a rectilinear groove extending in the direction of the line 57—58. It therefore permits the mirror to be turned without jamming, about the axis of rotation 58—59. Finally the screw 59 bears upon a smooth surface of the mount 54. Hence it allows the mirror to be pivoted, without jamming, about the axis of rotation 57—58, perpendicular to the axis 58—59.

Thanks to this arrangement the mirror can be tilted and adjusted with all the precision required in relation to the corresponding lens, so as to align and distribute the images in a rectilinear row in the plane of the sensitive surface S—S (Figure 1).

Figure 7:
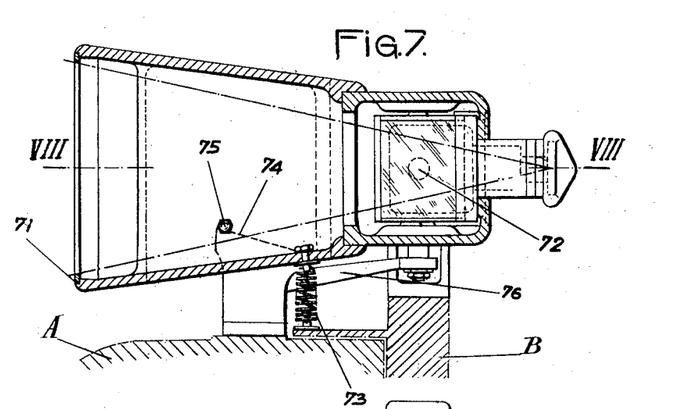
Figure 7 is a cross section of the telemeter, on the line VII—VII in Figure 8.
Figure 8:
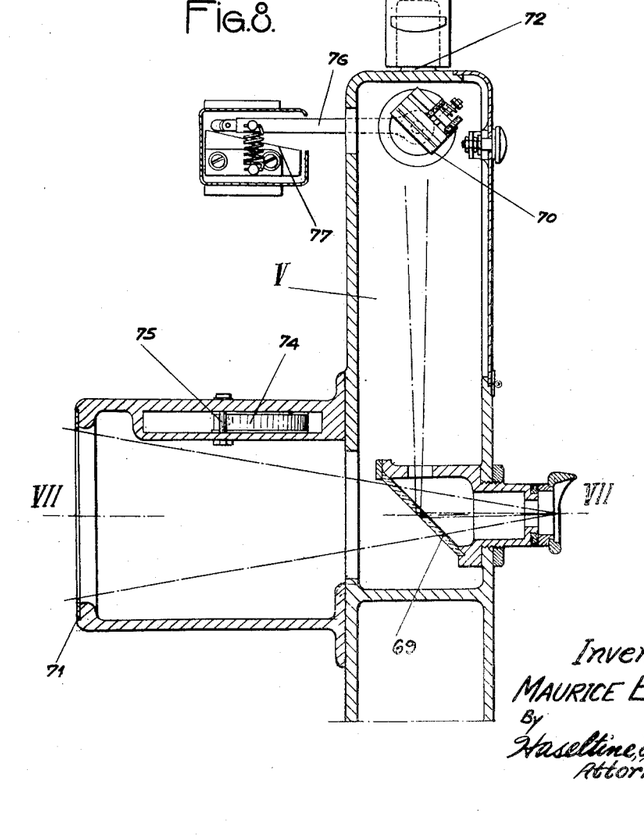
Figure 8 is a partial view in horizontal section on the line VIII—VIII in Figure 7.

The photographic camera properly so called is supplemented by a coupled telemeter viewfinder, denoted in its entirety by V, and represented in Figures 7 and 8. This telemeter is mounted upon the rear part B of the camera body. It comprises, in a known manner, a semi-transparent mirror 69, inclined at 45 degrees to the sighting axis, and an end mirror 70, rotatable about a vertical axis. The telemeter comprises a collimator sighting frame 71, ensuring for the observer the same field of vision as that of the camera lenses.

According to the invention, in order to eliminate parallax effects, the body of the telemeter is pivotally mounted in its unit upon two trunnions with horizontal ends 72, against the action of the return spring 73, which tends to tilt the telemeter downwards.

Upon the front part A of the camera body is fixed a ramp 74. A finger 75, pertaining to the telemeter body, is pressed against this ramp by the action of the spring 73. Thanks to this arrangement the relative sliding movement of the two parts, front and rear, of the body of the apparatus, tilts the telemeter to the extent necessary in order that its optical axis may always meet the sighting plane of the camera at the view-taking distance.

While the finger 75 is sliding over the ramp 74, the extremity of a lever 76, which is rigid with the vertical pivot of the movable mirror 70, at the same time moves against a ramp 77, as shown in Figure 8. The profile of this ramp is so designed, in a known manner, that the rotation of the mirror 70 may be proportional to the focusing distance.

The apparatus described operates in the following manner. The plate-holder C having been placed in the rear part B of the camera body, the focusing is effected by acting upon the crank 40, which sets in rotation the pinions 38 and 39 and the screw 36. The latter transmits its motion to the other three corner screws through the medium of the pinions 37 and the chain that connects them. The rotation of the screws 36 causes the displacement of the two bars 31 in the appropriate direction, through the medium of the nuts 35. The four angle tubes 32, 33 are thus displaced axially, against the action of the springs 34. They take along with them in their longitudinal movement the rear part B of the camera body, and the plate-holder C which this contains. The distance between the sensitized surface and the lenses is thus modified, in the proportion required by the focusing.

The cross bars 29 and 30 are displaced at the same time as the bars 31. These cross bars, by acting at the same time upon all the panels 16 of the partitions, cause the latter to slide in the corresponding guide slots 23, 24 in the frame plates 25, 26. The direction of these slots has been so arranged as to direct all the partitions 15 and 16 correctly for every sighting distance. At the same time the sliding of the panels 16 against the panels 15 of the partitions permits the lengthening or shortening of these partitions to the extent of the displacement of the rear part B in relation to the part A. Thus the rear edge of each panel 16 always remains very close to the light-sensitive surface at every focusing distance, which is indispensable in order to ensure clear delimitation between the various juxtaposed negative views.

The mechanism for adjusting the partitions has the result that the latter are always parallel when the camera is focused for infinity, and that their convergence is greatest when the camera is focused upon the nearest point compatible with its construction. In Figure 4 the partitions drawn in thin lines correspond to the focusing of the camera for infinity. The indication in heavy lines is that of the partitions when the camera is focused on a point close by. It will be observed that under these conditions, the total length of the two rows of negative images taken at each exposure is greater when the subject photographed is near at hand than when it is a great distance away. In Figure 4, $l$ indicates by way of example the length of each row of images for a photograph taken at infinity, and L the corresponding length for a subject near by.

In the course of the relative displacement of the two parts A and B of the body of the apparatus, the screw-threaded rod 48 (shown in Figure 5) has set in rotation the disc 44, in such a way that its graduation corresponding to the photographing distance is located in the field of the lens 50 inside the tube 49. At the same time the telemeter V, which bears upon the ramp 74 (see Figures 7 and 8), has received the inclination that is necessary in order that its sighting axis may intersect the sighting plane of the camera at the view-taking distance. The lever 76 of the pivoting mirror 70, in moving against its guiding ramp 77, has itself oriented the latter in such a way that the visual rays of the operator, after being reflected by the mirror 69 and by the mirror 70, meet upon the object sighted with those of the visual rays that have traversed without reflection the semi-transparent mirror 69.

If the operator then actuates the shutter 5, the latter opens to expose the two rows of negative images D on the light-sensitive surface, and at the same time it effects the recording, in the corner of the negative, of the focusing datum mark carried by the disc 44. This mark will serve, when projecting the negative, to re-establish the focusing of the apparatus. To this end the crank 40 will be manipulated until the corresponding numeral appears in the window 60 of an indicator mechanism 61 of any convenient construction, coupled to the crank 40.

Figure 9:
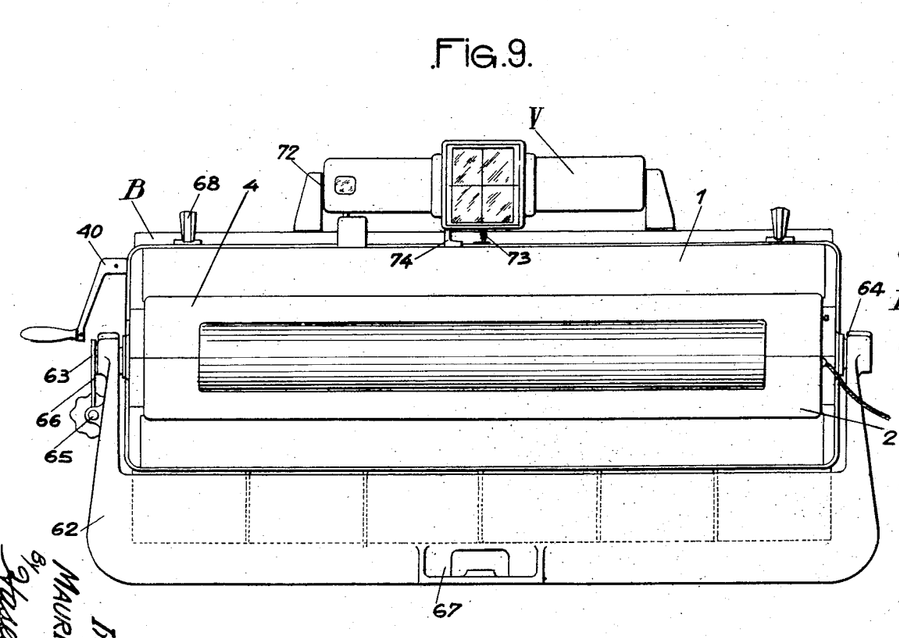
Figure 9 is a view in front elevation of the apparatus as a whole.
Figure 10:
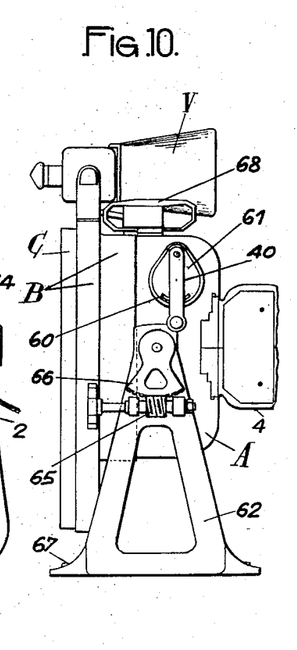
Figure 10 is a side view of the same.
Figure 11:
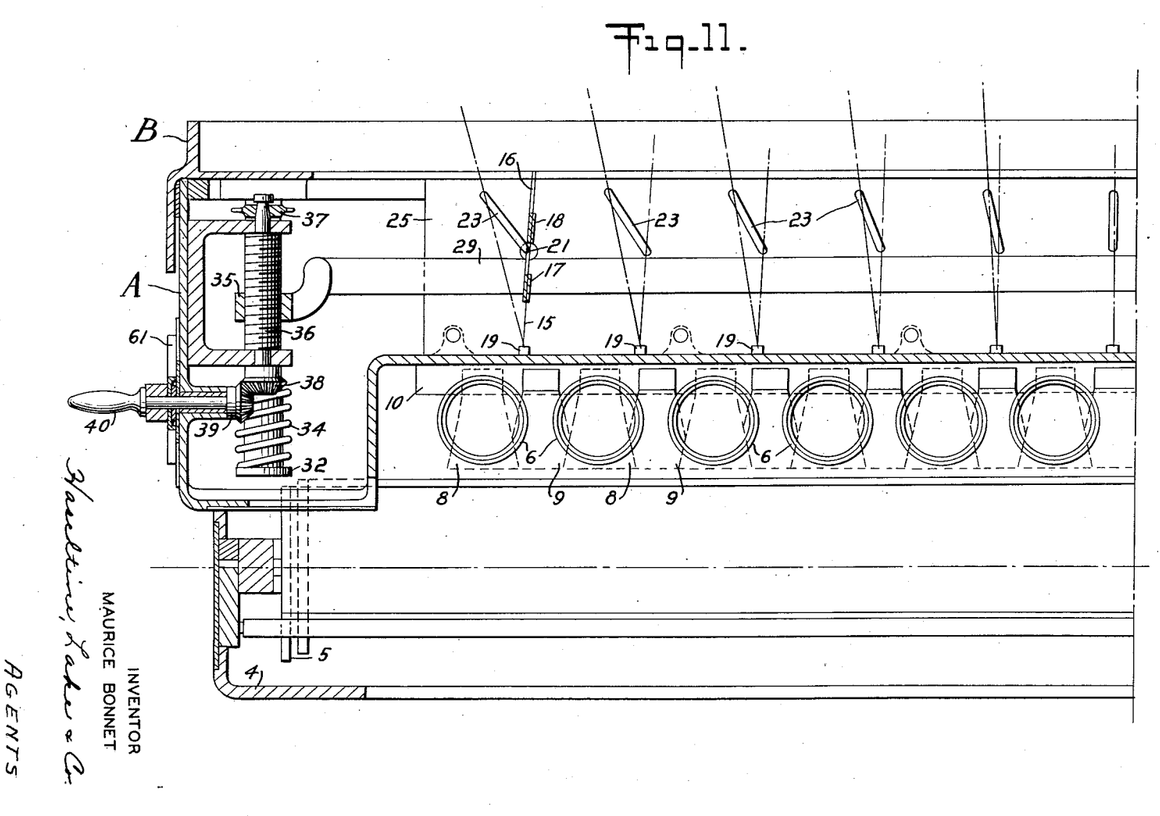
Figure 11 is a combined view of the apparatus shown in Figures 1, 2, and 4.

In practice, the apparatus described will advantageously be mounted in a frame structure 62, shown in Figures 9 and 10, to which it is articulated by two end trunnions 63 and 64. Means for progressively adjusting the inclination, for instance a worm 65 and worm sector 66, may be adopted, for the purpose of directing the camera at the point sighted.

The supporting frame 62 comprises a sole or base plate 67, whereby the apparatus may be placed upon a plane surface or fixed to the adjustable platform of a suitable stand. This arrangement enables the apparatus to be turned in any direction. Handles 68 may be provided in order to facilitate transport by hand.

It will be obvious that the apparatus illustrated constitutes in all cases only one form of construction, which is given merely by way of example, and that various constructional modifications may be made in the various members of the device described. This apparatus may moreover be provided with various known accessories to facilitate the manipulation thereof, such as a posemeter, a device for employing "lightning" lamps, etc.

It would also be possible without going outside the ambit of the invention, to employ roll films instead of plates. In this latter case, of course, the device for inverting and reversing the frame C will not have to be employed.

Having now particularly described and ascertained the nature of my said invention, and in what manner the same is to be performed, I declare that what I claim is:

1. In a photographic apparatus for simultaneously recording multiple negative images of the same subject, each image corresponding to a different point of view, and which comprises two horizontal rows of objective lenses, the optical axes of which are perpendicular to the sighting axis of the apparatus, and a central row of optical members for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface, being movable relatively to the front part, and means for separating from each other the groups of light-rays incident from each said objective lens and for exposing to each said group always the same portion of said light-sensitive surface whatever the relative positions of said front and rear body parts.

2. In a photographic apparatus for simultaneously recording multiple negative images of the same subject, each image corresponding to a different point of view, and which comprises two horizontal rows of objective lenses, the optical axes of which are perpendicular to the sighting axis of the apparatus, and a central row of optical members for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface being movable relatively to the front part, said front part being subdivided into as many elementary camera chambers as there are lenses, by means of vertical partitions which are both extensible and movable through vertical planes, the rear edges of said partitions being at all times close to the light-sensitive layer, so as to delimit clearly the dimensions of each image, the said partitions furthermore being at all times disposed radially of the point sighted.

3. In a photographic apparatus for simultaneously recording multiple negative images of the same subject, each image corresponding to a different point of view, and which comprises two horizontal rows of objective lenses, the optical axis of which are perpendicular to the sighting axis of the apparatus, and a central row of optical members, for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface being movable relatively to the front part, said front part being subdivided into as many elementary camera chambers as there are lenses, by means of vertical partitions which are both extensible and movable through vertical planes, the rear edges of said partitions being at all times close to the light-sensitive layer, so as to delimit clearly the dimensions of each image, the said partitions furthermore being at all times disposed radially of the point sighted, each partition being formed of two parallel panels, guided for sliding one against the other, the front panel being freely articulated by its front edge to the front body of the apparatus, while the rear panel carries two vertical tenons engaging in suitably directed slots in two horizontal frame plates, upper and lower, fixed in the front body, and two cross bars being provided which are rigid with the movable rear part of the body of the apparatus and engageable with the rear panels of the partitions, thereby controlling the displacements of said rear panels in the guide slots of the frame plates when the rear part of the apparatus is displaced in relation to the front part.

4. In a photographic apparatus for simultaneously recording multiple negative images of the same subject, each image corresponding to a different point of view, and which comprises two horizontal rows of objective lenses, the optical axes of which are perpendicular to the sighting axis of the apparatus, and a central row of optical members for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface, being movable relatively to the front part, the relative motion between the two parts of the body of the apparatus being obtained by means of four angle tubes, rigid with the rear part, and sliding in guides in the front part, against the action of return springs, each tube being coupled to a nut in which turns a manipulating screw, the four screws being rendered unitary in rotation by means of a chain meshing with four pinions fixed to the said screws.

5. In a photographic apparatus for simultaneously recording multiple negative images of the same subject, each image corresponding to a different point of view, and which comprises two horizontal rows of objective lenses, the optical axes of which are perpendicular to the sighting axis of the apparatus, and a central row of optical members for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface being movable relatively to the front part, and means for recording the focusing adjustment employed for taking each photograph, the said means comprising a masked lamp, means for automatically lighting the lamp when the shutter is released in making the exposure, and means for photographically recording on the negative an indication of the focal distance for which the camera is adjusted.

6. In a photographic apparatus for simultaneously recording multiple negative images of the same subject, each image corresponding to a different point of view, and which comprises two horizontal rows of objective lenses, the optical axes of which are perpendicular to the sighting axis of the apparatus, and a central row of optical members for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface being movable relatively to the front part, and means for recording the focusing adjustment employed for taking each photograph, the said means comprising a masked lamp, means for automatically lighting the lamp when the shutter is released in making the exposure, and means for photographically recording on the negative an indication of the focal distance of which the camera is adjusted, the indications of focal distance consisting of numbers expressing linear distances, these numbers being carried by a disc illuminated by the masked lamp, the disc being rotated by the relative movement of the two parts of the body of the apparatus, through the medium of a suitable mechanical connecting device.

7. In a photographic apparatus for simultaneously recording multiple negative images of the same subject, each image corresponding to a different point of view, and which comprises two horizontal rows of objective lenses, the optical axes of which are perpendicular to the sighting axis of the apparatus, and a central row of optical members for distributing alternately between the lenses of the two rows the rays of light coming from the subject, the provision of two rows of optical members located beyond the lenses in the path of the rays, these members reflecting the rays in a direction substantially parallel to that of the sighting axis of the apparatus, so as to impress all the images upon a single light sensitive surface, the plane of which is perpendicular to the sighting axis, the body of the apparatus being divided longitudinally into two parts in a vertical plane, the rear part, which carries the light-sensitive surface being movable relatively to the front part, said front part being subdivided into as many elementary camera chambers as there are lenses, by means of vertical partitions which are both extensible and movable through vertical planes, the rear edges of said partitions being at all times close to the light-sensitive layer, so as to delimit clearly the dimensions of each image, the said partitions furthermore being at all times disposed radially of the point sighted, said apparatus comprising furthermore a telemeter or view-finder of known type, coupled to the apparatus with a view to suppressing parallax, the telemeter or view-finder being, for this purpose, pivotally mounted as a whole by means of two horizontal end trunnions on the rear part of the body of the apparatus, against the action of a return spring, which bears against an inclined ramp pertaining to the front part of the body, the said ramp ensuring the constant convergence of the sighting axis of the telemeter or viewfinder with the sighting axis of the apparatus, at any focal distance for which the apparatus is adjusted.

MAURICE BONNET.

REFERENCES CITED

The following references are of record in the file of this patent:

UNITED STATES PATENTS

| Number | Name | Date |
|---|---|---|
| 755,235 | O'Donnell | Mar. 22, 1904 |

FOREIGN PATENTS

| Number | Country | Date |
|---|---|---|
| 352,773 | Great Britain | July 16, 1931 |
| 107,208 | Australia | Apr. 27, 1939 |